106. COMPOSITIONS, COATING OR PLASTIC.

Patented Oct. 8, 1935

2,016,796

UNITED STATES PATENT OFFICE 2,016,796

METHOD OF MAKING MOLDED PRODUCTS

Arthur S. Brock and Carl F. Meinzer, Chicago, Ill., assignors, by mesne assignments, to Wallace L. Caldwell, Birmingham, Ala.

No Drawing. Application July 25, 1934, Serial No. 736,908

10 Claims. (Cl. 18—47.5)

This invention relates to the manufacture of molded products by the use of steam curing under superatmospheric pressure. It refers particularly to the use of a mixture of water-granulated slag, preferably in pulverized or powdered condition and an alkali silicate preferably selected from the group consisting of sodium silicate and potassium silicate as a cementing material with or without the addition of small amounts of pulverized lime, silica, clay, talc, diatomaceous earth, bentonite, asbestos, asbestine, or similar admixtures.

Among the benefits secured in steam curing under pressure may be mentioned:

1. The compressive strength usually obtained through a slow process covering fourteen to twenty-eight days or more, is obtained in eight to twelve hours of steam curing under pressure.

2. The volume change or shrinkage of products cured by the usual methods during the drying-out period, is greatly reduced or practically eliminated when steam curing under pressure is used.

3. Products which are steam cured under pressure dry out rapidly to a practically constant amount of moisture in about forty-eight hours after removal from the kiln.

4. Due to the combination of the above three characteristics it is possible to obtain products when steam cured under pressure which may be delivered about three days or even less, after casting in the molds.

In addition to the above mentioned benefits of steam curing, mixtures of granulated slag and alkali silicates when steam cured under pressure, result in structures whose strength is out of all proportion to the amount of alkali silicate used. In other words, the alkali silicate appears to function in the nature of a catalyst to cause the slag to have cementing action, which is developed only in steam curing under superatmospheric pressure. In addition, the following benefits are also inherent in our process:

(a) The cost of the cementing material which consists of pulverized slag and an alkali silicate, will be much less than the cost of the usual Portland cement thus effecting a decided reduction in the cost of materials.

(b) When our invention is used with slag aggregates (especially granulated slag) either fine or coarse or both, there is a cementing action between the alkali silicate, concrete mixture if used, and the slag aggregates which clearly increases the strength and performance of these products over those made with Portland cement and slag aggregates.

(c) When pulverized slag is used with an alkali silicate with the addition of the concrete admixtures hereinbefore mentioned, a further reduction in the cost of the combined cementing materials is effected over the combination set out in paragraph "a".

The preferred proportions which may be used in making concrete products according to our invention are as follows:

| Material | Parts by weight |
|---|---|
| Pulverized slag | 10 |
| Aggregates (slag aggregates) | 25 |
| Sodium silicate solution | 1 |
| Water | 4 |
| Admixture | ½ |

The time and pressure of steam curing the above mixture to produce a strength equivalent to ordinary concrete is as follows:

| Time | Pressure |
|---|---|
| 1st hour | 0 to 75 pounds per square inch. |
| 2nd hour | 75 to 150 pounds per square inch. |
| 3rd to 7th hour inclusive | 150 pounds per square inch approximately constant. |
| 8th hour | 150 pounds per square inch to 0. |

The above proportions and pressures are given for purposes of illustration and in no sense are intended to limit our invention. It is also to be understood that variations of these items may be made over a wide range for various proportions and still produce satisfactory results. However, the proportion of alkali silicate in solution will never exceed twenty per cent and preferably not over ten per cent by weight of the total weight of the silicate and granulated slag of all grading, including the pulverized slag present in the molded product.

The pulverized slag used in the hereinbefore described mixture has substantially the same fineness as ordinary Portland cement or about ninety per cent passing a 200 mesh screen. However, it can vary from this fineness and still be used in our invention. The slag used herein is water-granulated slag derived from a molten blast furnace slag granulated in the presence of water. To produce pulverized or powdered slag the water-granulated slag is subjected to a conventional grinding or reducing process. The slag used may have a variety of chemical ingredients but it should preferably have a predominant amount of silicates and lime. The alkali silicates used may have the following properties:

| | |
|---|---|
| Na₂O or K₂O | 8.9% |
| SiO₂ | 28.7% |
| H₂O | 62.4% |
| Baumé | 41° |
| Weight per gallon, pounds approximately | 11.2 |

It is to be understood, however, that this solution can vary widely from these properties and still be used in our invention and, further, that the invention may be practiced by using the powdered silicates in place of the solution.

Molded products made in accordance with the present invention and based on the formula given in the specific example have developed structural strength in excess of 5,000 pounds per square inch. In addition, by suitable variations in proportions, strengths in excess of 10,000 pounds per square inch may be obtained. Obviously, this strength is out of all proportion to the amount of alkali silicate used and, hence, it is believed that the silicate functions in the nature of a catalyst in imparting cementing properties to the slag.

This hypothesis is based upon tests wherein various ingredients of a cementing mixture have been prepared and the resultant products tested. In one case the alkali silicate was omitted and in the other the pulverized slag was omitted and in each case substantially no appreciable compressive strength could be measured in a testing machine. Further, tests have been conducted of alkali silicate—pulverized slag mixtures cured in a conventional manner and no appreciable compressive strength has been obtained which can be measured in a conventional testing machine.

If desired, the alkali silicate and pulverized water-granulated slag may be used in conjunction with sand or gravel aggregates and the resultant mass steam cured in the hereinbefore described manner. A heavier, more dense resultant product will obviously be obtained than if slag aggregates are used.

By the expression "steam curing under super-atmospheric pressure", we wish to include any other process by which there is obtained a curing in the presence of moisture at a temperature of 212° F., or greater.

By the expression "admixture" as used in the specification and claims, is meant such materials as pulverized lime, silica, clay, talc, diatomaceous earth, bentonite, asbestos, asbestine, or other similar materials.

We claim as our invention:
1. A process of making molded products comprising mixing pulverized slag and alkali silicate, and steam curing the mixture under super-atmospheric pressure.
2. A process of making molded products comprising mixing pulverized water-granulated slag and alkali silicate, and steam curing the mixture under super-atmospheric pressure.
3. A process of making molded products comprising mixing pulverized water-granulated slag and sodium silicate, and steam curing the mixture under super-atmospheric pressure.
4. A process of making molded products comprising mixing pulverized water-granulated slag and potassium silicate, and steam curing the mixture under super-atmospheric pressure.
5. A process of making molded products which comprises, mixing slag aggregate, an alkali silicate and pulverized water-granulated slag, and steam curing the mixture under super-atmospheric pressure.
6. A process of making molded products which comprises, mixing pulverized, water-granulated slag, an alkali silicate and an admixture, and steam curing the mass under super-atmospheric pressure.
7. A process of making molded products comprising, mixing pulverized water-granulated slag and an alkali silicate taken from the group consisting of sodium silicate and potassium silicate, and steam curing the mixture under super-atmospheric pressure.
8. A process of making molded products comprising mixing pulverized water-granulated slag and an alkali silicate selected from the group consisting of sodium silicate and potassium silicate in an amount less than 20% of the total mass and steam curing the mixture under super-atmospheric pressure.
9. A process of making molded products comprising mixing pulverized water-granulated slag and an alkali silicate selected from the group consisting of sodium silicate and potassium silicate in an amount less than ten per cent and steam curing the mixture under super-atmospheric pressure.
10. A process of making molded products comprising mixing pulverized water-granulated slag, an alkali silicate and an aggregate, and steam curing the mass under super-atmospheric pressure.

ARTHUR S. BROCK.
CARL F. MEINZER.